May 13, 1958 R. W. SPENCER 2,834,893

MAGNETIC AMPLIFIER FLIP-FLOP CIRCUIT

Filed Jan. 10, 1955 2 Sheets-Sheet 1

INVENTOR

RICHARD W. SPENCER

BY Efeny Light

ATTORNEY

INVENTOR
RICHARD W. SPENCER
BY
ATTORNEY 2,834,893

MAGNETIC AMPLIFIER FLIP-FLOP CIRCUIT

Richard W. Spencer, Philadelphia, Pa., assignor, by mesne assignments, to Sperry Rand Corporation, New York, N. Y., a corporation of Delaware Application January 10, 1955, Serial No. 480,671

21 Claims. (Cl. 307—88)

The present invention relates to magnetic amplifier circuits and more particularly to a carrier type magnetic amplifier flip-flop circuit.

Carrier type magnetic amplifiers have been utilized in the past in a number of circuit configurations. The basic full wave circuit may comprise a pair of magnetic cores coupled to a source of carrier frequency potential by power windings and a pair of rectifiers, and to a source of signal potential by a signal winding. The windings on the respective cores may be so interconnected that in the normal course of operation energy coupled to one of the cores during a half cycle of carrier potential is also coupled to the other core to condition the latter preparatory to the coupling of power thereto in the next half cycle of carrier potential.

As is known in the art, the amplifier may be adjusted so that in the absence of a signal input thereto the output voltage will be a minimum. For optimum operation the amplitude of the carrier potential may be adjusted so that each core will traverse its entire hysteresis loop during one-half cycle of carrier potential.

Various circuit arrangements including vacuum tubes or transistors have been employed in the past to produce flip-flop devices. The present invention is particularly concerned with a magnetic amplifier flip-flop device.

It is accordingly an object of the invention to provide a novel magnetic amplifier circuit.

A further object of the invention is to provide a novel magnetic amplifier circuit of the carrier type.

Another object of the invention is to provide a novel flip-flop circuit.

An additional object of the invention is to provide a unique flip-flop circuit of the delay type.

The foregoing objects of the invention may be realized generally by employing a carrier type self-saturating magnetic amplifier with a positive feedback path from the output circuit to the input circuit. The foregoing and other objects of the invention will become more apparent in the following detailed description of the invention taken in conjunction with the accompanying drawings wherein.

Figures 5, 6, 7, 8, 9, 10, 11:
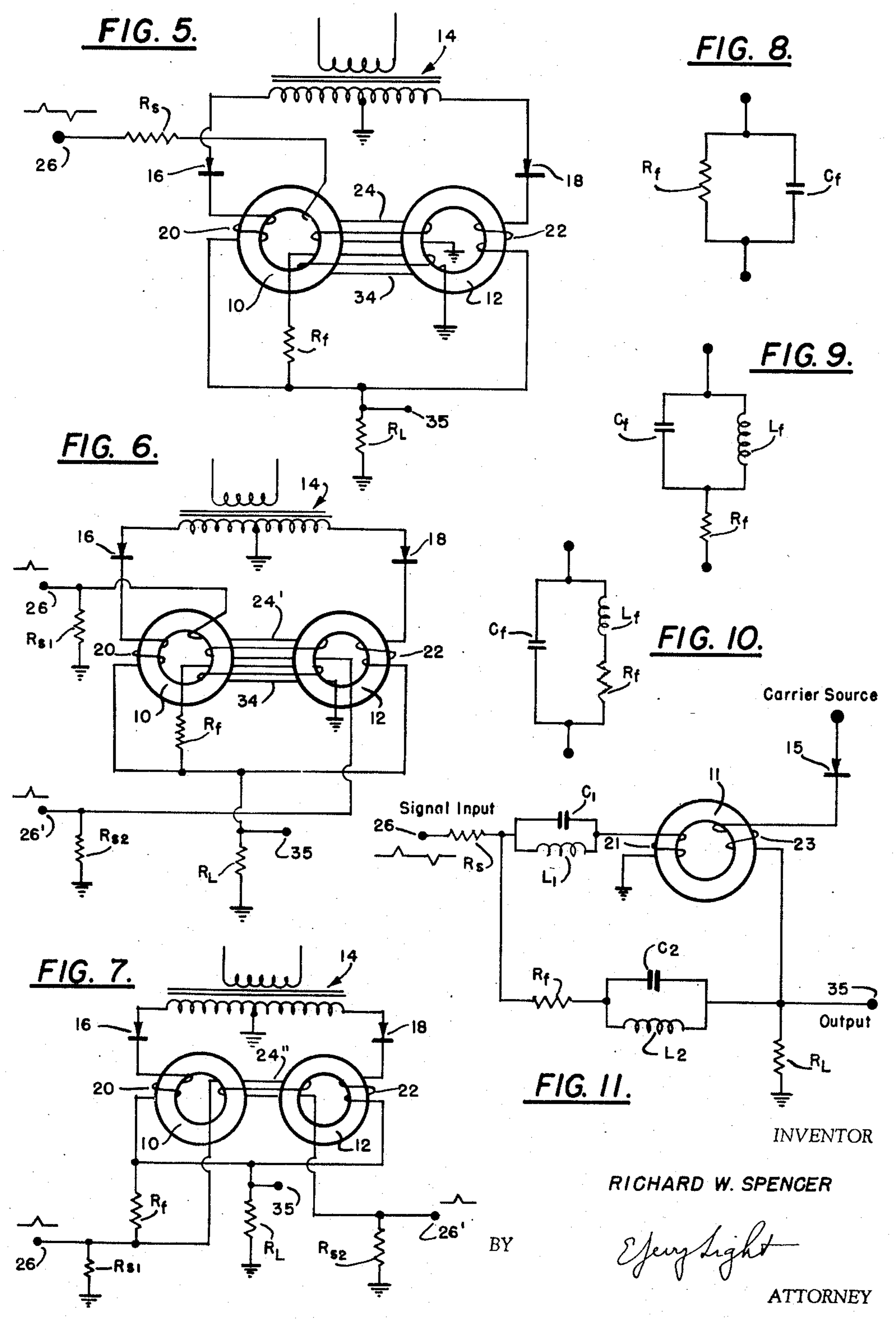
Figure 5 is a circuit diagram of a modification employing separate signal and feedback windings.
Figure 6 is a circuit diagram of a modification employing separate signal and feedback windings as well as two input terminals.
Figure 7 is a circuit diagram of a modification employing a unitary signal and feedback winding with two input terminals.

Figures 8, 9, and 10 illustrate alternative feedback networks; and

Figure 11 is a circuit diagram of the invention in its broader aspects as applied to a single-ended amplifier.

Figures 1, 2, 3:
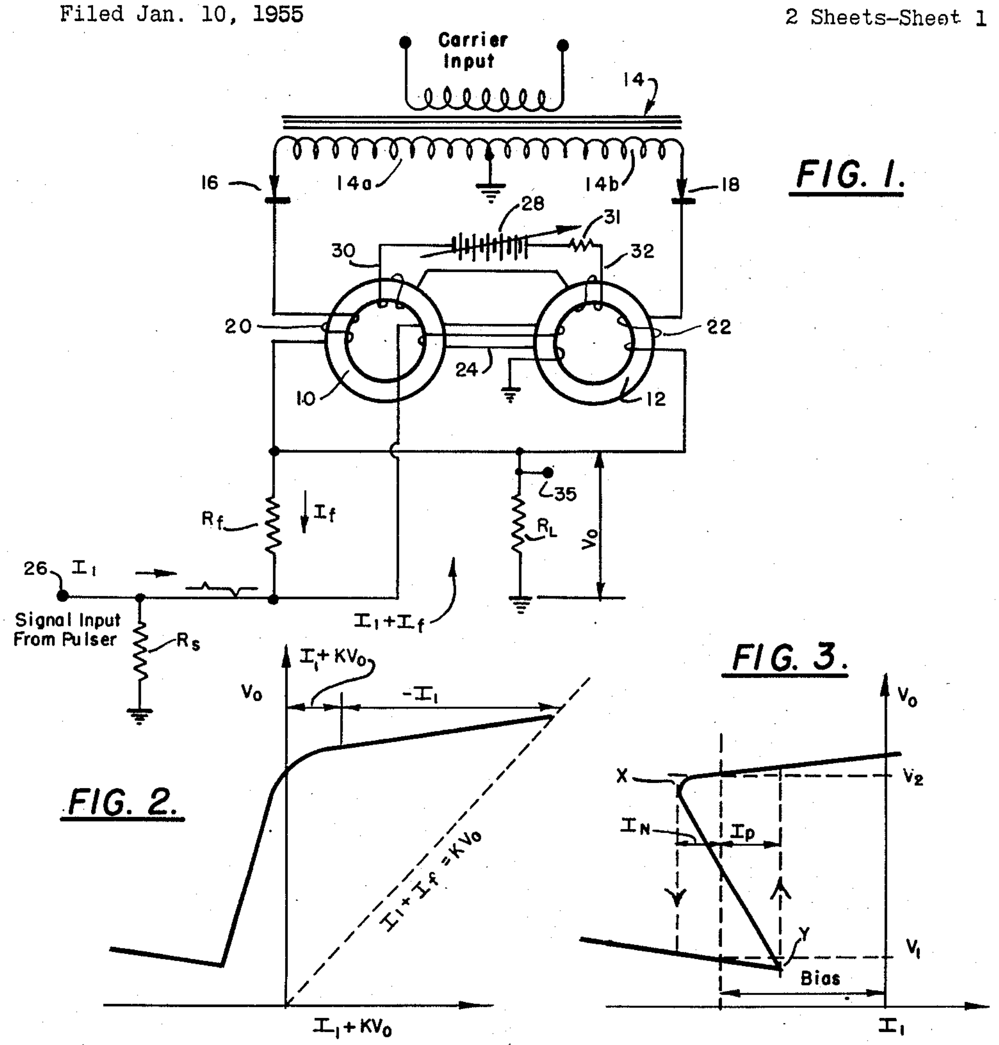
Figure 1 is a circuit diagram of a preferred form of the invention.
Figure 2 is an explanatory graph.
Figure 3 is a graph depicting the operation of the circuit of Figure 1.

Referring to Figure 1, reference numerals 10 and 12 designate a pair of magnetic cores, which preferably but not necessarily, are formed from a material exhibiting a substantially rectangular hysteresis loop. Such cores may be made of a variety of materials, among which are the various types of ferrites and various kinds of magnetic tapes, including Orthonik and 4–79 Moly-Permalloy. These materials may be given heat treatments to produce the desired properties. The cores may be constructed in a number of different geometrical configurations including both closed and open paths. Cup-shaped cores, strips of material, or toroidal cores may be used, but it is to be understood that the present invention is not limited to a specific core form or to a specific hysteresis loop configuration.

Power is supplied to the amplifier through a carrier frequency power transformer 14, the primary winding of which is connected to a source of carrier potential, and the secondary winding of which is coupled to the respective cores through a pair of diodes 16, 18. The center tap of the secondary winding is grounded as illustrated. Diodes 16 and 18 may be constituted by any of the conventional rectifiers including crystals and vacuum tubes.

Core 10 carries a power winding 20, one end of which is connected to diode 16 and the other end of which is connected to a load impedance $R_L$. Core 12 carries a power winding 22 connected to diode 18 and the load impedance in the same manner. One end of the load impedance may be grounded as indicated to complete a pair of series circuits including, respectively, the halves of the power transformer secondary winding, 14*a*, 14*b*, diodes 16, 18, power windings 20, 22, and the load impedance $R_L$. An output terminal 35 may be connected to the upper end of the load impedance, and the output potential may be filtered to remove carrier frequency components. The term "carrier frequency" as employed herein denotes a frequency in excess of approximately three to five times the intelligence or signal frequency, as is usually understood in the electrical arts. While no sharp line can be designated, of course, suffice it to say that the carrier frequency is sufficiently higher than the highest intelligence frequency to allow the carrier and intelligence frequencies to be readily separated by a detector and filter circuit.

Cores 10 and 12 also carry a signal winding 24, which may be in the form of one continuous coil as illustrated or a pair of coils wound on the respective cores and connected in series. One end of winding 24 is connected to a signal input terminal 26, to which may be applied a pulsating signal, and to one end of an input impedance $R_S$. The other end of winding 24 is connected to the complementary end of the input impedance.

Bias may be applied to the cores from a suitable source of potential 28 by virtue of bias windings 30, 32, also carried by the respective cores in series with a current limiting resistor 31. The source of bias may be adjustable, and if desired, may be connected into the input circuit or the output circuit of the amplifier rather than to separate bias windings, as is well known in the art.

A feedback impedance $R_f$ is connected as illustrated from the output circuit to the input circuit of the amplifier. The purpose of this impedance will appear more fully in the description below. In the absence of the feedback impedance the operation of the amplifier is substantially as described in the co-pending application of Theodore H. Bonn and Richard W. Spencer, Serial No. 468,468, filed November 12, 1954, and entitled Biased Carrier For Magnetic Amplifiers. Assuming the absence of the aforesaid feedback means and also assuming that no signal is fed to input terminal 26, the operation is as follows: When the right end of the secondary of transformer 14 becomes positive, current will flow through rectifier 18, coil 22, to the load $R_L$, inducing a potential in coil 24 which will revert core 10, so that during the next half cycle when the left end of the secondary of transformer 14 becomes positive, the current flowing through rectifier 16 and coil 20 will find the core in a reverted condition and will drive the same positively along an unsaturated portion of the hysteresis curve, whereby coil 20 has high impedance, and only a small current flows to the load. Since core 10 is being driven along an unsaturated portion of the hysteresis curve, there will be a large rate of change of flux, and a large potential will be induced in coil 24, which will cause flow of current therethrough and revert core 12 to negative remanence. On the next half cycle (the right hand end of the secondary winding being positive) the positive pulse flowing through rectifier 18 and coil 22 will drive core 12 along an unsaturated portion of its hysteresis curve, thereby inducing potential in winding 24 which reverts core 10 as above. Coil 22 has high impedance to the aforesaid flow of current therethrough; hence the current to load $R_L$ is small. Potential induced in coil 24 may effect a current flow therethrough and through the input circuit, which is assumed to have sufficiently low resistance to enable this result to occur. Hence, as long as there is no signal at input terminal 26, coils 20 and 22 will have high impedance and there will be substantially no current through the load $R_L$. If, however, there is a signal at input terminal 26, the signal will oppose the reverting effects of the currents in coil 24 which flow due to induction of potential therein, and both cores 10 and 12 will be driven to saturation by the positive pulses flowing through coils 20 and 22 from the carrier supply, whereby coils 20 and 22 will have low impedance and the currents will readily flow therethrough to the load.

The characteristics of the above described amplifier with feedback may be computed from those without feedback. The feedback current is proportional to the output voltage $V_0$, or $I_f=KV_0$, where $I_f$ represents the feedback current. The output voltage is some function of $I_1+I_f$ regardless of feedback, where $I_1$ is the signal input current. This function may be determined by measurements without feedback (with $R_f$ connected in parallel with $R_L$ instead of as illustrated in Figure 1). The resulting function is shown in Figure 2. $I_1$, $I_f$, and $V_0$ are, of course, constituted by D. C. and signal frequency components (carrier fundamental and harmonics, assumed to be much higher than signal frequency, not included).

If K is known, $V_0$ may be plotted as a function of $I_1$. The constant K may be readily determined from the values of the circuit parameters, and in the circuit illustrated $K=1/R_f$ if signal winding resistance is negligible. The resulting function is illustrated in Figure 3. In this figure the distance horizontally from the curve to the $V_0$ axis is equal to the horizontal distance in Figure 2 from the curve to the line $I_1+I_f=KV_0$ at the same ordinate level.

The negative slope region between points X and Y has been found to be unstable. When the amplifier is biased as illustrated in Figure 3, the output voltage will either be $V_1$ or $V_2$. If a positive pulse of amplitude $I_P$ or greater is applied to input terminal 26, the circuit will flip from its stable condition with output $V_1$ to its stable condition with output $V_2$. Conversely, if a negative pulse of amplitude $I_N$ or greater is applied to input terminal 26, the circuit will flop back to its initial condition. Thus by the application of successive positive and negative pulses to the input terminal 26, the circuit may be caused to alternate between its two stable conditions.

For flip-flop action to occur, the curve in Figure 2 must have a higher slope in some region than that of line $I_1+I_f=KV_0$. If this is not the case, there will be no negative slope region in Figure 3. Expressed algebraically, for flip-flop action $$\frac{\Delta V_0}{\Delta(I_1+I_f)}>\frac{1}{K}=R_f$$

For stable operation the interval $I_N+I_P$ in Figure 3 should be large, so that drift in bias or gain will not cause flipping. Of course, the height of the trigger pulses must be commensurate with the magnitude of this interval, so that optimum interval magnitude and pulse height must be determined by the tolerances and the input power requirements.

Figure 4:
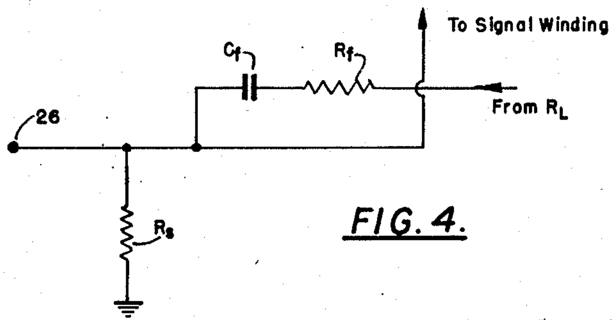
Figure 4 is an illustration of a modified form of the circuit of Figure 1.

Figure 4 illustrates a modification of the invention. By placing a suitable capacitor $C_f$ in series with resistor $R_f$ a so-called "delay flop" is obtained. Capacitor $C_f$ allows the feedback current to flow only for a limited time after the application of a flipping pulse to the input terminal. After this time, the circuit will flop back to its initial condition.

In the modifications illustrated in Figures 5, 6 and 7 components corresponding to those of Figure 1 have been designated by the same reference characters. For simplicity the bias sources have not been illustrated. In the embodiment of Figure 5 a separate feedback winding 34 is utilized. This coil is wound on cores 10 and 12 so that the feedback is in a positive sense. The input impedance $R_S$ in this figure has been illustrated in series with signal winding 24, rather than in parallel as in Figure 1. Where the input is shown as in Figure 1, a current signal source is applied, while where shown as in Figure 5, a voltage source is implied. The sources are equivalent if $e(t)=i(t)R_S$, where e(t) and i(t) are the voltage and current sources, respectively, and may be used interchangeably in any of the embodiments.

The device of Figure 5 is responsive to alternate positive and negative pulses as previously set forth. Figure 6 illustrates a modification responsive to successive pulses of the same polarity. Separate input terminals 26, 26′ and associated input impedance $R_{S1}$, $R_{S2}$ are connected to the respective ends of the signal winding 24′. A positive pulse on terminal 26 initiates flow of high output current (flip), and a positive pulse on terminal 26′ terminates the flow (flop). By interchanging the functions of the terminals, negative pulses may be employed.

In the embodiment of Figure 7 the ends of a unitary signal and feedback winding (as in Figure 1) are connected to the respective input terminals 26, 26′. The operation is otherwise in accordance with that of Figure 6. It should be noted that in both Figures 6 and 7, successive pulses of opposite polarity may be applied to either input terminal to produce flip-flop action as in Figures 1 and 5. If desired, of course, separate signal windings could be employed for each of the respective input terminals.

Figures 8, 9, and 10 illustrate feedback networks which may be employed in place of the resistor of Figure 1 or the series resistor-capacitor combination of Figure 4. The arrangement of Figure 8, including a parallel resistor-capacitor combination, may be utilized to increase speed of operation, while the arrangements of Figures 9 and 10 may be utilized to prevent carrier frequency second harmonic from entering the input circuit. In each of the latter embodiments a tank circuit, including capacitor $C_f$ and inductor $L_f$, tuned to the second harmonic is employed in conjunction with feedback resistor $R_f$.

In its broader aspects, the invention may be embodied in a single-ended amplifier. Figure 11 illustrates such an amplifier, which may comprise a single magnetic core 11, a rectifier 15 connected to a source of carrier frequency, a power winding 23 connected in series with rectifier 15 and load impedance $R_L$, and a signal winding 21 connected to an input circuit including impedance $R_S$. A feedback circuit comprising impedance $R_f$ is connected from the load impedance to the input circuit. It will be appreciated that the other feedback networks and the other coil connections described above may be employed according to the broader aspects of the invention in the single-ended embodiment of Figure 11.

A filter including a parallel combination of capacitor $C_1$ and inductor $L_1$ is inserted in the input circuit. This filter may be tuned to exhibit a high impedance to carrier frequency components and thus ensure the elimination of such components from the signal input circuit. A similar filter $C_2$, $L_2$ may be inserted in the feedback circuit. As in the foregoing embodiments, a suitable bias supply may be provided. The bias, or other auxiliary source, may be employed to revert the core to negative remanence during the interval when the negative half-cycles of carrier potential are applied to rectifier 15.

While a preferred embodiment of the invention has been shown and described, it is to be understood that this embodiment is illustrative, not restrictive of the invention. Many variations will be suggested to those skilled in the art and such variations which are in accordance with the principles of the invention are intended to fall within the scope of the following claims. It is to be noted, for example, that the output impedance or load $R_L$, while represented by a resistor, may in practice comprise the primary circuit of an output transformer or the input circuit of a successive stage of amplification.

Having thus described my invention, I claim:

1. A magnetic amplifier circuit comprising a pair of magnetic cores, a source of carrier potential, coil means for coupling said source of carrier potential to said cores, a load impedance connected to said last-mentioned means, a source of pulsating signal potential including an input impedance, coil means for coupling said source of signal potential to said cores, and means for coupling a positive-feedback potential from said load impedance to said cores.

2. The circuit of claim 1, further including means for coupling a bias potential to said cores.

3. The circuit of claim 1, said first-mentioned coil means being connected to one end of said load impedance, said source of carrier potential comprising a transformer having a center-tapped secondary winding the ends of which are connected to said first-mentioned coil means, the center tap of said secondary winding being connected to the other end of said load impedance.

4. The circuit of claim 3, including a pair of rectifiers interposed respectively between the ends of said secondary winding and said first-mentioned coil means.

5. The circuit of claim 1, the last-mentioned means including means for limiting the time during which feedback current may flow.

6. The circuit of claim 5, said limiting means comprising a capacitor.

7. In combination, a pair of magnetic cores, a source of alternating carrier potential, a power winding circuit coupling said source with said cores and including a conductor linking both said cores, a source of positive and negative signal pulses, a signal winding circuit coupling said signal source with said cores and including a conductor linking both said cores, a load impedance connected to said power winding circuit, and means providing a positive-feedback path from said load impedance to said signal winding circuit.

8. The combination of claim 7, wherein said last-mentioned means comprises a resistor.

9. The combination of claim 7, further including a source of unidirectional bias potential and means for coupling said bias source with said cores.

10. The combination of claim 7, said power winding circuit including means for rectifying said carrier potential and applying alternate rectified half-cycles of carrier potential to the ends of said power winding conductor, respectively.

11. A full wave carrier magnetic amplifier circuit comprising a pair of magnetic cores, a source of carrier current coupled to said cores, a source of positive and negative pulses coupled to said cores, a load impedance coupled to said cores, and means for causing the potential across said impedance to vary from a first value to a second value in response to positive pulses and from said second value to said first value in response to negative pulses.

12. The amplifier circuit of claim 11, wherein said means comprises an impedance coupling said load impedance and said source of pulses.

13. A magnetic amplifier flip-flop circuit comprising magnetic core means, a source of carrier oscillations, a source of relatively low frequency signal pulses, means for producing a flux in said core means in response to said carrier oscillations, means for producing a flux in said core means in response to said signal pulses, an output impedance coupled to said core means for developing an output potential, and means for producing a positive feedback flux in said core means in response to said output potential.

14. The circuit of claim 13, wherein said means for producing a flux in response to said signal pulses comprises a winding on said core means, said source of signal pulses comprising means for applying successive pulses of opposite polarity to one end of said winding.

15. The circuit of claim 13, wherein said means for producing a flux in response to said signal pulses comprises a winding on said core means, said source of signal pulses comprising means for applying successive pulses of the same polarity to opposite ends of said winding.

16. The circuit of claim 13, wherein said means for producing a flux in response to said signal pulses comprises a winding on said core means, and said means for producing a feedback flux comprises a separate winding on said core means.

17. In a magnetic control circuit, magnetic core means, a source of carrier potential, first coil means on said core means, means coupling one end of said first coil means to said carrier source for producing a flux in said core means, an output circuit coupled to the other end of said first coil means, rectifier means in series with said first coil means between said carrier source and said output circuit, a signal source, second coil means on said core means coupled to said signal source for selectively producing a further flux in said core means in response to occurrence of a signal from said signal source, and impedance means coupling said output circuit to said core means for producing a feedback flux in said core means in additive relation to said further flux in response to an output voltage in said output circuit.

18. The circuit of claim 17 wherein said signal source comprises means producing unidirectional signal pulses.

19. The circuit of claim 17 wherein said signal source comprises means producing positive-going and negative-going signal pulses with respect to a predetermined datum.

20. A magnetic core flip-flop comprising magnetic core means, means for supplying alternating signals, first winding means linked to said magnetic core means and connected to said signal supplying means to be energized thereby, second winding means linked to said magnetic core means, and connected in circuit with said first winding means to be energized unidirectionally in accordance with the alternating current in said first winding means whereby said circuit of said first and second winding means has two stable regions of operation corresponding respectively to high and low currents in said winding means and an unstable region in transition therebetween, and signal input means connected to said second winding means for applying thereto oppositely directed currents to change the state of said circuit to different stable regions, respectively.

21. A magnetic core flip-flop comprising magnetic core means having a substantially rectangular hysteresis characteristics, means for supplying alternating signals, first winding means linked to said magnetic core means and connected to said signal supplying means to be energized thereby, second winding means linked to said magnetic core means, output impedance means, said second winding means and said output impedance means being connected in circuit with said first winding means to be energized unidirectionally in accordance with the alternating current in said first winding means whereby said circuit of said first and second winding means has two stable regions of operation corresponding respectively to high and low currents in said winding means and an unstable region in transition therebetween, and signal input means connected to said second winding means for applying thereto oppositely directed currents to change the state of said circuit to different stable regions, respectively.

No references cited.

UNITED STATES PATENT OFFICE

CERTIFICATE OF CORRECTION

Patent No. 2,834,893 May 13, 1958

Richard W. Spencer

It is hereby certified that error appears in the printed specification of the above numbered patent requiring correction and that the said Letters Patent should read as corrected below.

Column 4, line 31, for "applied" read -- implied --.

Signed and sealed this 14th day of October 1958.

(SEAL)
Attest:

KARL H. AXLINE
Attesting Officer

ROBERT C. WATSON
Commissioner of Patents